United States Patent
Shitomi et al.

(10) Patent No.: US 8,099,622 B2
(45) Date of Patent: Jan. 17, 2012

(54) FAILOVER METHOD OF REMOTELY-MIRRORED CLUSTERED FILE SERVERS

(75) Inventors: Hidehisa Shitomi, Mountain View, CA (US); Manabu Kitamura, Kanagawa (JP)

(73) Assignee: Hitachi, Ltd., Tokyo (JP)

( * ) Notice: Subject to any disclaimer, the term of this patent is extended or adjusted under 35 U.S.C. 154(b) by 344 days.

(21) Appl. No.: 12/408,951

(22) Filed: Mar. 23, 2009

(65) Prior Publication Data

US 2009/0177720 A1 Jul. 9, 2009

Related U.S. Application Data

(63) Continuation of application No. 11/448,907, filed on Jun. 8, 2006, now Pat. No. 7,526,668.

(51) Int. Cl.
*G06F 11/00* (2006.01)
(52) U.S. Cl. .......................................................... 714/3
(58) Field of Classification Search .................. 714/2, 3, 714/4.11, 4.12, 4.21, 4.3, 4.4, 6.1, 6.11, 6.12, 714/6.13, 6.23, 6.3, 6.31, 11–13, 15, 16, 714/31, 42
See application file for complete search history.

(56) References Cited

U.S. PATENT DOCUMENTS

| | | | |
|---|---|---|---|
| 5,513,314 A * | 4/1996 | Kandasamy et al. ......... | 714/6.31 |
| 6,192,408 B1 | 2/2001 | Vahalia et al. | |
| 6,275,953 B1 | 8/2001 | Vahalia et al. | |
| 7,254,636 B1 * | 8/2007 | O'Toole et al. .............. | 709/230 |
| 7,260,737 B1 * | 8/2007 | Lent et al. .................... | 714/5.11 |
| 7,370,025 B1 | 5/2008 | Pandit | |
| 7,383,463 B2 * | 6/2008 | Hayden et al. ............... | 714/4.11 |
| 7,546,319 B1 * | 6/2009 | Srinivasan et al. ................ | 1/1 |
| 7,734,951 B1 * | 6/2010 | Balasubramanian et al. ........................... | 714/6.13 |
| 7,739,543 B1 * | 6/2010 | Pittman et al. .............. | 714/6.32 |
| 2005/0015663 A1 * | 1/2005 | Armangau et al. ........... | 714/15 |
| 2005/0223278 A1 * | 10/2005 | Saika .............................. | 714/15 |
| 2006/0074925 A1 * | 4/2006 | Bixby et al. .................. | 707/100 |
| 2007/0192551 A1 * | 8/2007 | Hara et al. .................... | 711/162 |

OTHER PUBLICATIONS

Shepler, S. et al, "Network File System (NFS) version 4 Protocol", Network Applicance, Inc., 2005, pp. 1-230.
Noveck, David et al, "Implementation Guide for Referrals in NFSv4 draft-ietf-nfsv4-referrals-00.txt", The Internet Society, Jul. 2005, pp. 1-51.
Pawlowski, Brian et al, "The NFS Version 4 Protocol", Network Applicance Technical Reports—TR3085, Network Appliance Inc., 2005, 30 pages.

* cited by examiner

*Primary Examiner* — Nadeem Iqbal
(74) *Attorney, Agent, or Firm* — Mattingly & Malur, PC (57) ABSTRACT

By incorporating a referral mechanism, a failover method and system for remotely mirrored clustered file servers enables a client computer to transparently access a remotely mirrored file system during a failover of a first NAS (network attached storage) storing the file system. The first NAS is clustered with a second NAS that takes over the IP address of the first NAS on failover. A mirroring relationship is established between the first NAS and a third NAS whereby a copy of the file system is replicated to the third NAS. A referral is created on the second NAS, such that an access attempt from the client computer for accessing the first file system that is directed to the second NAS following IP address takeover from the first NAS after failover is referred to the third NAS by the referral to enable the client computer to access the copy of the file system.

8 Claims, 12 Drawing Sheets

FAILOVER METHOD OF REMOTELY-MIRRORED CLUSTERED FILE SERVERS

CROSS-REFERENCES

This is a continuation application of U.S. Ser. No. 11/448,907, filed Jun. 8, 2006 now U.S. Pat. No. 7,526,668, the entire disclosure of the above-identified application is hereby incorporated by reference.

BACKGROUND OF THE INVENTION

1. Field of the Invention

The present invention relates generally to file servers, such as Network Attached Storage (NAS) systems and, in particular, to failover methods in a clustered NAS system.

2. Description of Related Art

Clustering is the use of multiple computers, multiple storage devices, and redundant interconnections, to form what appears to users as a single highly-available system. Clustering can be used for load balancing as well as to provide high availability. A clustered file system (also referred to as a clustered Network Attached Storage (NAS)) system may include a plurality of file systems, and creates at least one single namespace. A namespace is a set of valid names recognized by a file system that identifies the directory tree structure of the directories and file path names that combine to form a complete file system.

In a clustered NAS file system, the file system (sometimes referred to as a "global file system" or "GFS") may be distributed across multiple NAS devices or nodes, while appearing to a user as a complete single file system located on a single device. One method of achieving this under the Network File System (NFS) version 4 (NFSv4) protocol involves providing network file system or server software on the NAS hosts, whereby "referrals" on one host are used to indicate the storage location of directories and files on another host.

The present invention is directed mainly to NAS systems incorporating NFSv4 technology (see, e.g., Shepler, S. et al., "IETF RFC3530: Network File System (NFS) version 4 Protocol", www.ietf.org, April 2004 "NFS version 4 Protocol", www.ietf.org/rfc/rfc3530.txt; and Novack, D. et al., "Implementation Guide for Referrals in NFSv4 draft-ietf-nfsv4-referrals-00.txt", www.ietf.org, July 2005). NFSv4 is a network file sharing protocol that is the next generation of NFSv3, which is currently one of the most popular network file sharing protocols. However, while the NFSv4 protocol sets forth a "migration" function, it does not disclose or suggest any remote copy function or failover methods in a clustered file system or clustered NAS environment.

When a failure occurs on one of the NAS nodes in a cluster, the NFSv4 client is not able to access the file system or portion of the file system on the failed NAS node until file system has been recovered from the remotely-mirrored file system back onto the failed NAS node. Alternatively, the IP address of the failed NAS node can be taken over to another NAS node in the cluster using existing clustering software. However, even if the IP address is taken over in this matter, there is normally not the same data in the NAS node which took over the IP address as in the failed NAS. The mirrored file system is typically located on a remote NAS node, which means it is located on the different subnet, separated by a router or the like. Thus, the NFSv4 client is not able to continue accessing the file system on the failed node until backup data on the remote node is recovered to the failed node. The present invention seeks to address the need for providing a backup method and failover system in the NFSv4 environment.

BRIEF SUMMARY OF THE INVENTION

This invention discloses a failover method for remotely-mirrored clustered file servers. According to the present invention, the file servers or NAS nodes form a cluster. Within each cluster, the internet protocol (IP) address of one NAS node can be taken over by another NAS node. In addition, for purposes of providing backup, each file system in a NAS is mirrored in a file system at a remote site. Under the present invention, a failover method is provided for remotely-mirrored clustered file servers, such as clustered NAS nodes (also referred to herein as NAS servers or NAS systems), using referral information to enable NFSv4 clients to access the remotely-mirrored file system upon failover of a NAS storing the primary file system. This enables the NFSv4 clients to transparently access the backed-up data in one or more remotely-mirrored file systems at a failover of the primary node containing the primary file system.

These and other features and advantages of the present invention will become apparent to those of ordinary skill in the art in view of the following detailed description of the preferred embodiments.

BRIEF DESCRIPTION OF THE DRAWINGS

The accompanying drawings, in conjunction with the general description given above, and the detailed description of the preferred embodiments given below, serve to illustrate and explain the principles of the preferred embodiments of the best mode of the invention presently contemplated.

DETAILED DESCRIPTION OF THE INVENTION

In the following detailed description of the invention, reference is made to the accompanying drawings which form a part of the disclosure, and, in which are shown by way of illustration, and not of limitation, specific embodiments by which the invention may be practiced. In the drawings, like numerals describe substantially similar components throughout the several views. Further, the drawings, the foregoing discussion, and following description are exemplary and explanatory only, and are not intended to limit the scope of the invention or this application in any fashion.

First Embodiment

System Architecture

Figure 1:
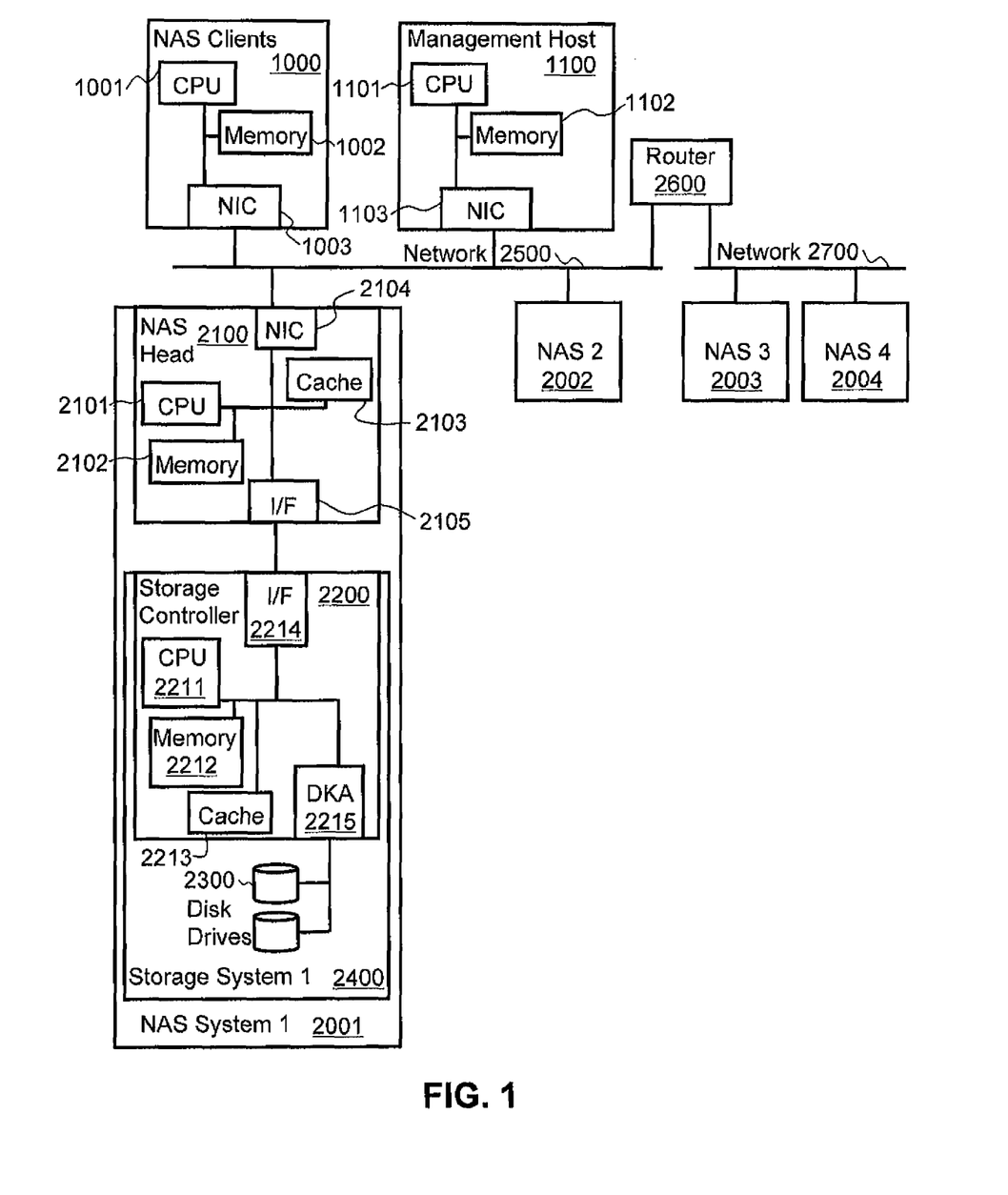
FIG. 1 illustrates an example of a hardware configuration in which the method and apparatus of this invention is applied.

FIG. 1 illustrates an example of a hardware configuration in which the method and apparatus of the invention are applied. The system is composed of one or more NAS clients 1000, a management host 1100, and plural NAS Systems 2001-2004 (NAS1-NAS4). Each NAS client 1000 includes a CPU 1001 and memory 1002 for storing and executing programs, such as one or more applications and NFSv4 client software (illustrated in FIG. 2). Each NAS client 1000 also includes a network interface card or adapter (NIC) 1003 for connecting the NAS client 1000 to NAS1-NAS4 2001-2004 via a network 2500, a router 2600, and another network 2700. The typical media/protocol of the networks 2500 and 2700 may be Ethernet, but other network types and protocols may also be used.

Management Host 1100 includes a memory 1102 and a CPU 1101 for storing and executing management software (illustrated in FIG. 2) and other programs. Management host 1100 includes a NIC 1103 for connecting the NAS client 1000 to NAS1-NAS4 2001-2004, respectively, via a network 2500, a router 2600, and another network 2700. Networks 2500, 2700 may be Ethernet protocol LANs (local area networks) or sub-networks.

NAS Systems NAS1 2001, NAS2 2002, NAS3 2003, and NAS4 2004 consist of two main parts: a NAS head 2100 and a storage system 2400. Because NAS1-NAS4 2001-2004 may include essentially the same components, only NAS1 2001 is described, with it being understood that NAS systems NAS2-NAS4 2002-2004 may contain the same or functionally equivalent components. Further, while only four NAS systems 2001-2004 are illustrated, it should be understood that any number of NAS systems may be connected for communication and implemented in the invention.

NAS head 2100 includes a CPU 2101, a memory 2102, a cache 2103, a front-end network interface (NIC) 2104, and a back-end interface (I/F) 2105. As described in greater detail with reference to FIG. 2, a plurality of programs for processing NFS requests or other operations are stored in memory 2102 and executed by CPU 2002. Cache memory 2103 temporarily stores NFS write data from NFS clients 1000 before the data is forwarded into the storage system 2400, and cache 2103 also may store NFS read data that are requested by the NFS clients 1000. Cache memory 2103 may be a battery backed-up non-volatile memory. In another implementation, memory 2102 and cache memory 2103 are combined as a common memory.

Front-end I/F (NIC) 2104 is used to connect NAS head 2100 to network 2500 to enable communication between NAS clients 1000 and NAS head 2100, and may be an Ethernet protocol device. Back-end I/F 2105 is used to connect between NAS head 2100 and storage system 2400. Fibre Channel (FC) and Ethernet are typical examples of connection formats that may be used. Alternatively, in the case of an internal connection between NAS head 2100 and controller 2200, a system bus, such as PCI (peripheral component interface), is a typical example of the connection.

NAS head 2100 processes requests from the NFS clients 1000 and management host 1100. The storage system 2400 consists of a storage controller 2200 and disk drives 2300. NAS head 2100 and storage system 2400 can be connected via interface 2105 and 2214. NAS head 2100 and storage system 2400 can exist in one storage unit. In such a case, the two elements are connected via a system bus such as a PCI bus. In alternative embodiments, the NAS head and controller may be physically separated. In this case, the two elements can be connected via network connections such as Fibre Channel or Ethernet.

The storage controller 2200 in storage system 2400 includes a CPU 2211, a memory 2212, a cache memory 2213, a host interface 2214, and a disk interface (DKA) 2215. Storage controller 2200 processes I/O requests from the NAS head 2100. As will be discussed in greater detail below with reference to FIG. 2, programs to process I/O requests and perform other operations are stored in the memory 2212 and executed by CPU 2211. Cache memory 2213 stores the write data from the NAS head 2100 temporally before the data is stored into disk drives 2300, and cache memory 2213 can also be used to store the read data that is requested by the NAS head 2100. Cache memory 2213 may be a battery backed-up non-volatile memory. Further, in another implementation, memory 2212 and cache memory 2213 can be combined as a single common memory.

Host interface 2214 is used to connect between NAS head 2100 and controller 2200. Fibre Channel and Ethernet are typical examples of connection protocols used. Alternatively, a system bus connection, such as PCI, may be used. Disk adapter (DKA) 2215 is used to connect disk drives 2300 with the storage controller 2200. Each of disk drives 2300 processes I/O requests in accordance with SCSI (small computer system interface) device commands. Further, it should be noted that the architecture discussed above is exemplary for explanation purposes, and numerous other appropriate hardware architectures may be applied to the invention.

Software Configuration

Figure 2:
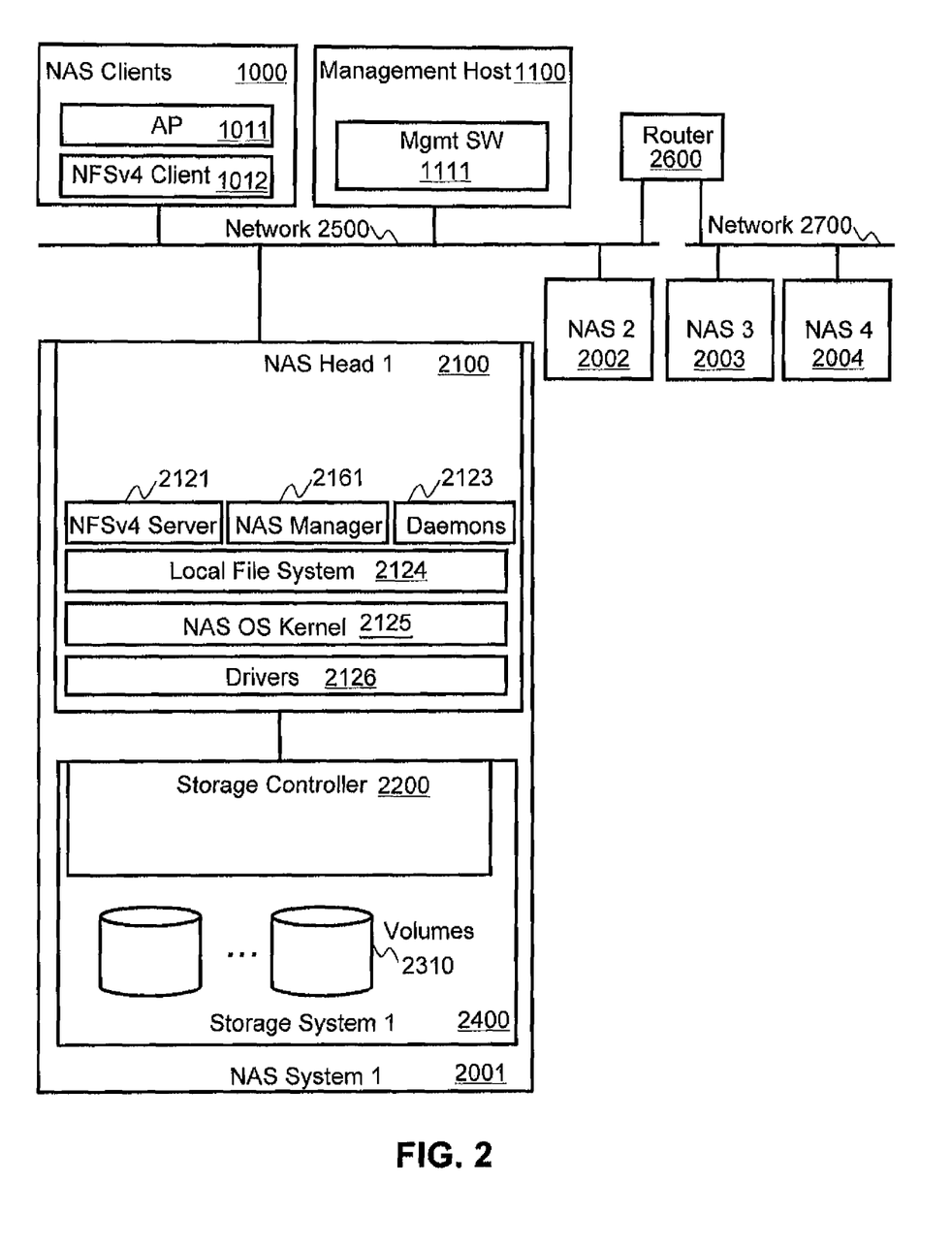
FIG. 2 illustrates an exemplary software configuration under which the method and apparatus of this invention is applied.

FIG. 2 illustrates an example of a software configuration in which the method and apparatus of the invention are applied. The system includes software on NAS clients 1000, management host 1100, and NAS systems or nodes NAS1-NAS4 2001-2004.

As discussed above, NAS client 1000 is a computer on which an application (AP) 1011 generates file manipulating operations, such as read and write operations or I/O (input/output). An NFSv4 client program 1012 is also active on the NAS client node 1000. The NFSv4 client program communicates with an NFSv4 server program 2121 on NAS1 2001 through network protocols such as TCP/IP. The NFSv4 clients 1012 and NFSv4 server 2121 are able to communicate via network 2500 and/or 2700. Moreover, router 2600 can be applied to connect separate sub LAN networks 2500, 2700 to act as a single LAN.

Management software 1111 resides on the management host 1100. Storage management operations such as remote copy operations and recovery operations can be issued from management software 1111.

As discussed above, each NAS system or node NAS1 2001, NAS2 2002, NAS3 2003, and NAS4 2004 consists of two main parts, NAS head 2100 and storage system 2400, each of which performs distinct functions, as described below:

NAS head 2100: File related operations are processed in NAS head 2100. NFSv4 server 2121 resides on NAS head 2100 in order to communicate with NFSv4 client 1012 on the NAS clients 1000. A number of service program modules also run on the NAS head 2100, such as service daemons 2123 and NAS manager software 2161. The local file system 2124 processes file I/O operations to the storage system 2400, a NAS operating system (OS) kernel 2125 provides functional infrastructure, and drivers of storage system 2126 translate the file I/O operations to the block level operations, and communicate with storage controller 2200 via SCSI commands. The software modules discussed above and below are stored in memory on their respective devices, or on other computer readable medium such as hard disk devices, either locally or remotely.

Storage system 2400: Storage controller 2200 processes SCSI commands received from NAS head 2100 for performing read and write operations to logical volumes 2310 which are created from one or more of disk devices 2300. A volume 2310 may be composed of one or more disk drives 2300, or multiple volumes 2310 may be created on a single disk drive 2300. NFSv4 file systems are created in volumes 2310 for storing files according to a file system directory tree data structure having files and directories. As will be described in greater detail below, file system or a portion thereof may be created on a single volume or on multiple volumes in the same NAS server, or on multiple volumes in multiple NAS servers. Also, multiple file systems or portions thereof may be created on a single volume.

NFSv4 Migration

The NFSv4 protocol includes a migration feature for migrating all or part of a file system from one storage system to another. By using a special file system location attribute, "fs_location", the ability to migrate server file systems is enabled within the NFSv4 protocol. The file system locations attribute provides a method for the NAS client to query the server about the location of a file system or a portion of a file system, such as a directory or file. In the event that all or some of a file system has been migrated from its original storage system, the NAS client will receive an error "NFS4ERR_MOVED" response when attempting to access or otherwise operate on the moved file system, and the NAS client can then query as to the new location of the file system or file system portion. The original NAS file server will then send information to the NAS client to indicate the new location of the migrated file system or portion thereof. From this information, the client can use its own policies to access the appropriate file system location.

The fs_location attribute provides a list of file system locations. These locations are specified by providing the server name (either DNS (domain name system) domain or IP address) and the path name representing the root of the file system. Depending on the type of service being provided, the list will provide a new location or a set of alternate locations for the file system. The client will use this information to redirect its requests to the new NAS server.

Figure 3:
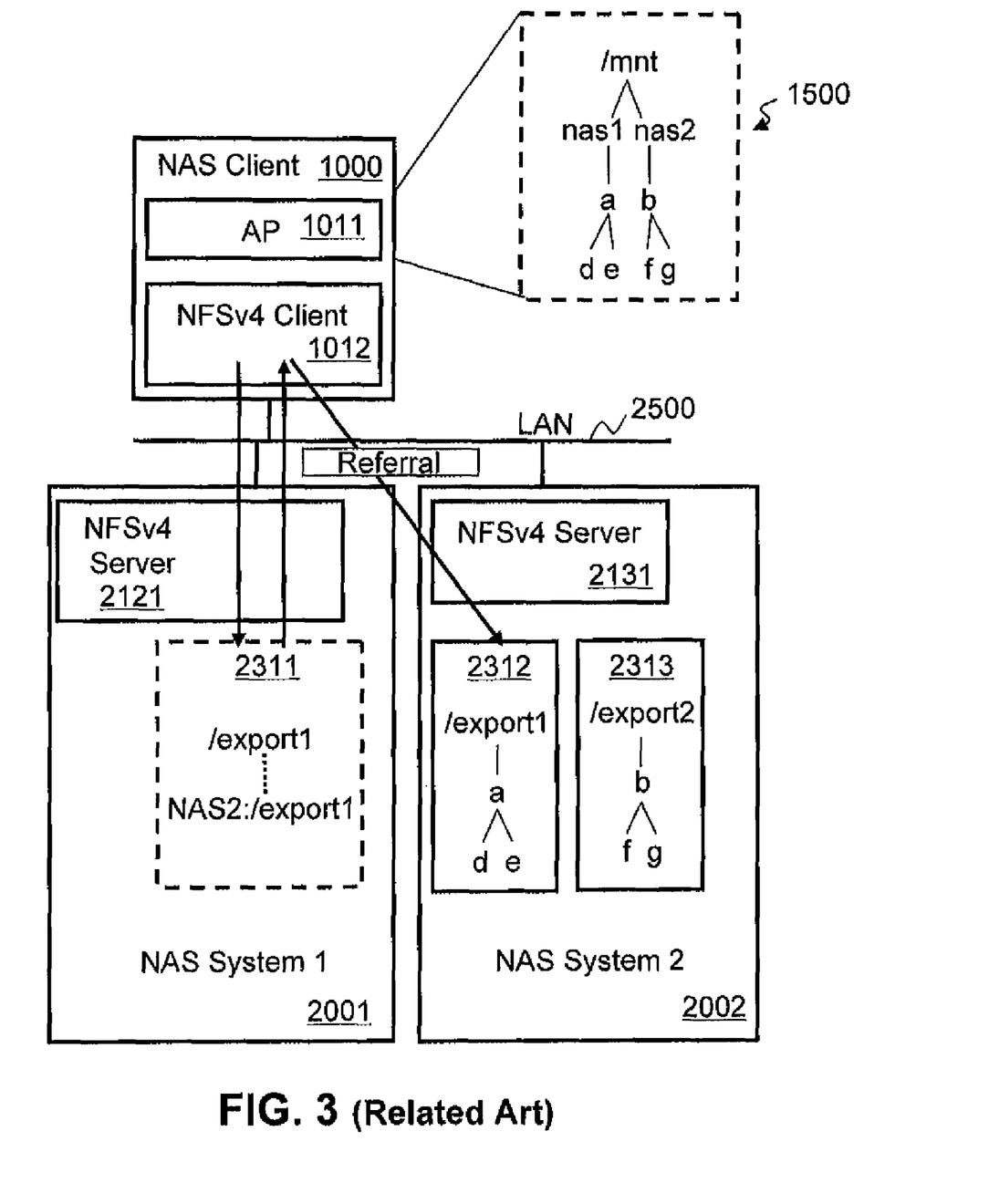
FIG. 3 illustrates a conceptual diagram of a migration feature provided in NFSv4 protocol.

FIG. 3 illustrates a conceptual diagram of the migration feature carried out under the NFSv4 protocol. A file system "export1" 2311 is created on a volume in NAS1 2001 and a second file system "export2" 2313 is created on a volume in NAS2 2002 for exporting to the NFSv4 client. An NFSv4 client 1012 mounts file systems exported by NAS1 "export1" 2311 as "/mnt/nas1" and NAS2 "export2" 2313 as "/mnt/nas2". Then, application software 1011 is able to see a file system as illustrated by directory tree 1500, which virtually appears to application software 1011 to have a unitary structure of a complete file system, even though the directory tree is actually split among two different NAS systems 2001, 2002. At some point in time, the file system /export1 2311 on NAS1 2001 is migrated to a file system /export1 2312 on NAS2. After the migration process, when the NFSv4 client 1000 attempts to access the directory tree "/export1", such as by using an NFSv4 read operation to the file system 2311, NFSv4 server 2121 returns NFS4ERR_MOVED and a referral file which describes a location of the migrated file system export 1 2311 as now being on NAS2. Then, the NFSv4 client 1012 can redirect the operation to the current location of file system export1 2312 by making the access request to an NFSv4 server 2131 on NAS2 2002.

Figure 4:
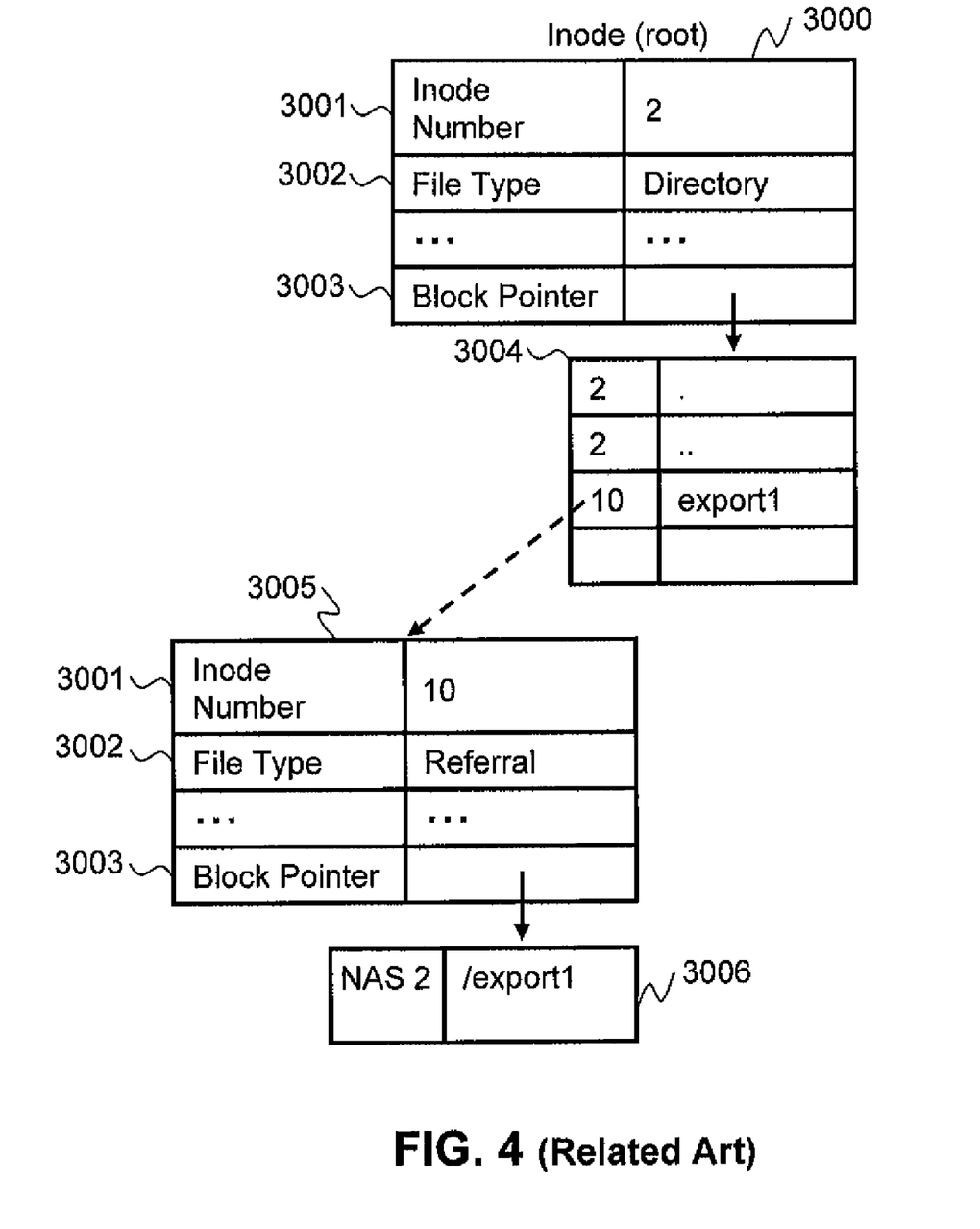
FIG. 4 illustrates an exemplary data structure of a referral in a file system for use with the invention.

FIG. 4 illustrates an example of a data structure of a referral in a file system, such as the file system illustrated in FIG. 3, wherein an inode is able to refer a client to a migrated file system. An inode can be used to indicate a file, a directory, or a referral. Each inode includes an inode number 3001, a file type 3002, and a block pointer 3003 that indicates a disk block address where file or directory information is stored. If the inode indicates a file (if its file type field 3002 is "file"), the data block pointed to from the pointer 3003 in the inode contains actual data of the file. If a file is stored in a plurality of blocks (such as ten blocks), the addresses of the ten disk blocks are recorded in block pointer 3003. On the other hand, if the inode is for a directory, such as inode 3000 then the file type field 3002 is "directory", and the data blocks pointed to from block pointer 3003 store a list 3004 of inode numbers and names of all files and directories (subdirectories) in the directory (i.e., directory entry). Thus, in FIG. 4, root inode 3000 is a directory-type inode that includes an inode number "10" to a directory "export1". However, since the directory tree for "export1" has been migrated from NAS1 2001 to NAS2 2002, a referral file inode 3005 has replaced the original "export1" directory inode. The referral inode 3005 can point to a block address for a file 3006 in the local file system 2124 that describes the location of the file system "NAS2:/export1". Additionally, it should be noted that there can be other implementations of referrals, and the implementation method should not be interpreted as restricting the invention.

Figure 5:
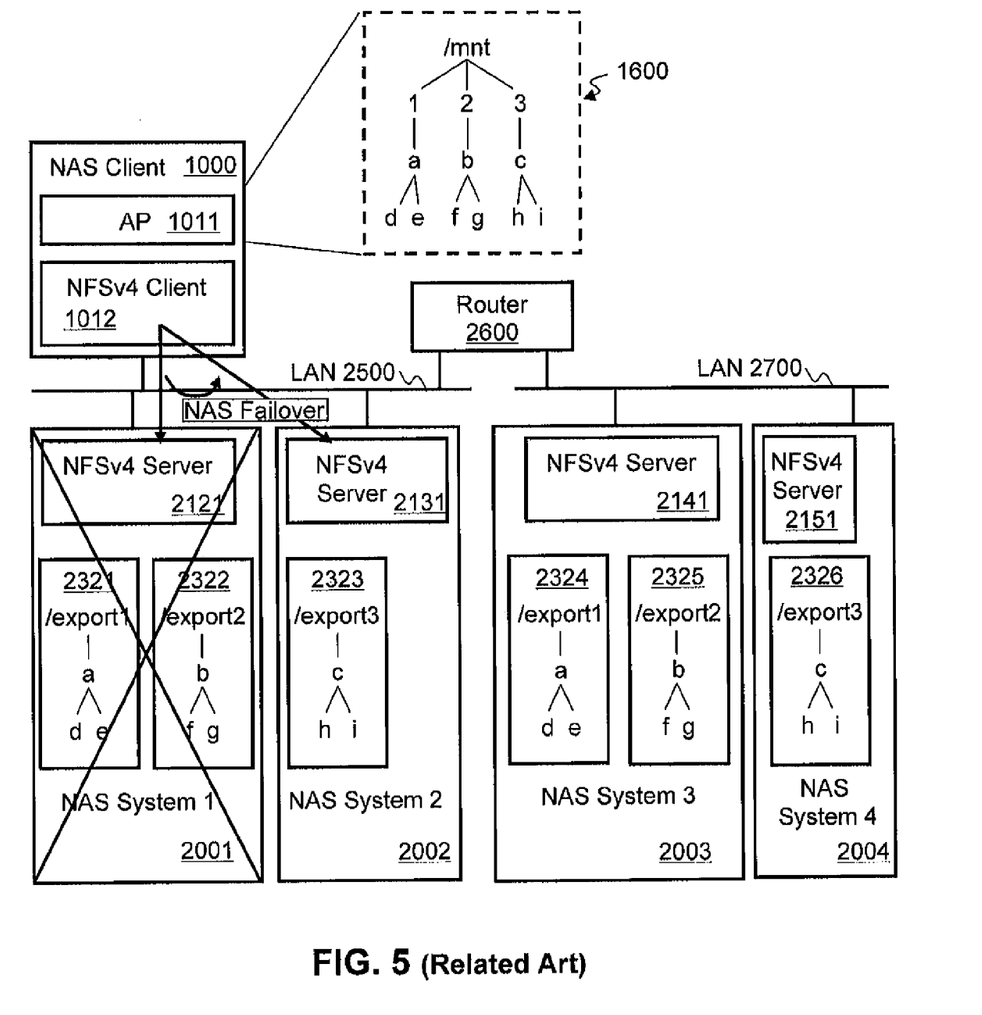
FIG. 5 illustrates a conceptual diagram of a problematic situation that can occur in conventional clustered NAS systems.

FIG. 5 illustrates a conceptual diagram of a problematic situation that can occur with the current system described above. A complete file system 1600 is visible to application 1011 on NAS client 1000, and is distributed on NAS1 2001 and NAS2 2002, as illustrated. The NFSv4 client 1012 NFS mounts file systems "export1" 2321 as "/mnt/1" and "export2" 2322 as "/mnt/2", and "export3" 2323 as "/mnt/3". Once the file systems are mounted, application software 1011 on client 1000 is able to perceive the directory tree 1600 as a complete file system, as illustrated in FIG. 5.

In order to provide remote copy backup of NAS1 2001 and NAS2 2002, the exported file systems are replicated to remote NAS3 2003 and remote NAS4 2004, respectively. Thus, in this example, the file system 2321 is replicated to a file system 2324 on NAS3 2003; the file system 2322 is replicated to a file system 2325 on NAS3 2003, and the file system 2323 is replicated to a file system 2326 on NAS4 2004. NAS1 2001 and NAS2 2002 are located on the same sub-network or subnet 2500. NAS3 2003 and NAS4 2004 are located on the same subnet 2700. The subnets 2500 and 2700 are different subnets but are in communication via router 2600. Now, when a failure occurs on NAS1 2001, the NFSv4 client cannot keep accessing the file systems 2321 and 2322 until the backup data on NAS3 2003 has been recovered to NAS1 2001.

The IP address of NAS1 2001 can be taken over to the NAS2 2002 using clustering software. However, even if the IP address is taken over, there is no data in NAS2 2002 corresponding to the file systems 2321 and 2322 of NAS 1 2001. The backup data is located on NAS3 2003, and because NAS3 2003 is located on the different subnet 2700 and not part of the same clustered NAS system as NAS1 2001 and NAS2 2002, NAS3 2003 cannot take over the IP address of NAS1 2001. Accordingly, the NFSv4 client 1000 is unable to access to the file systems 2321 and 2322 until the backup data on NAS3 2003 is recovered to NAS1 2001.

Under the example described above, a two-node clustering (NAS1 and NAS2 make a cluster) arrangement and a two-node replication scenario (NAS1 and NAS3 make a pair, and NAS2 and NAS4 make a pair) is employed. However, it should be understood that the invention can be applied to more than two-node clustering and replication. In that case, the IP address can be taken over to one of the other nodes within a cluster. Further, it should be noted that the failover process changes a mapping between IP address and MAC (Media Access Control) address of a NAS front end port. To do that, a NAS sends a Gratuitous-ARP (Address Resolution Protocol) request for the IP address in order to replace the ARP cache for NAS clients, LAN switches, and the like. The gratuitous ARP message is in layer 2 (data link), which is not possible to distribute across routers, which handle layer 3 (network) in the conventional open system interconnection model. Accordingly, typical failover from a NAS on one subnet to a NAS on another subnet cannot be carried out.

Figure 6:
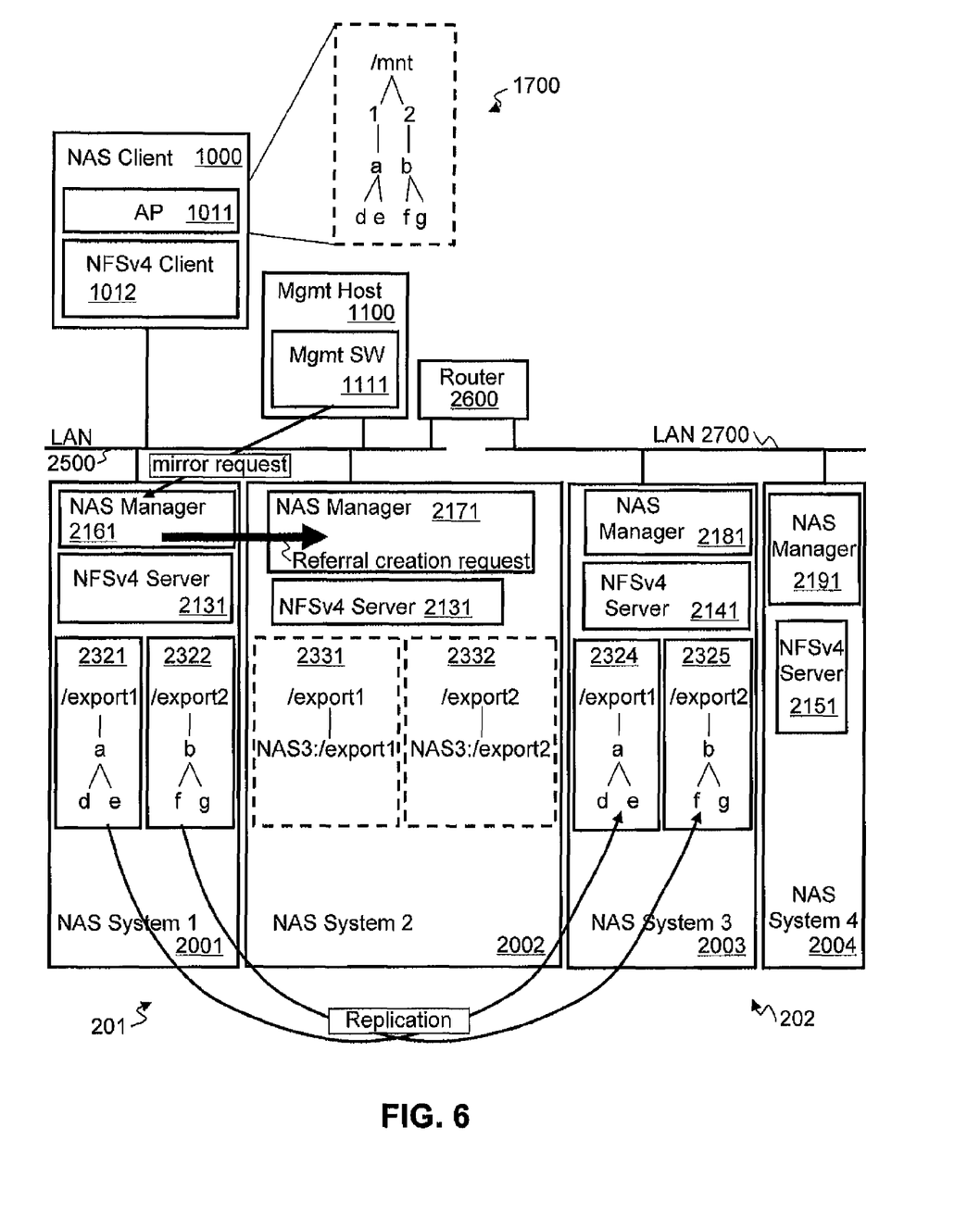
FIG. 6 illustrates a conceptual diagram of redirection mechanisms provided by the NFSv4 protocol as modified and applied according to the invention.

FIG. 6 illustrates a conceptual diagram of a first embodiment of the invention. The invention employs the migration and redirection mechanisms provided by the NFSv4 protocol to solve the problem described with reference to FIG. 5. In order to make the explanation of the invention simpler, an exported file system created on the NAS2 2002, such as "export3" 2323 in FIG. 5, is eliminated from the example of FIG. 6, but it should be understood that the invention could be equally applied to any number of NAS systems in a clustered NAS arrangement having any number of file systems. As illustrated in FIG. 6, file systems 2321 and 2322 are created for exporting to the NFSv4 client 1012. An NFSv4 client 1012 on NAS client 1000 mounts the file systems exported by NAS1 "export1" 2321 as "/mnt/1" and "export2" 2322 as "/mnt/2". Following this, application software 1011 is able see a directory tree that appears as a virtually complete directory tree 1700. For creating a remote data backup, the exported file systems 2321 and 2322 are replicated to NAS3 2003, so that the file system 2321 is replicated to a file system 2324 on NAS3 2003 and the file system 2322 is replicated to a file system 2325. NAS1 2001 and NAS2 2002 are located on the same subnet 2500 and make up a first clustered NAS system 201. NAS3 2003 is located on the subnet 2700, and may form part of a second clustered NAS system 202 with NAS4 2004, which may be at a remote location from the first clustered NAS system 201. The subnets 2500 and 2700 are different subnets able to communicate via network equipment such as via router 2600. NAS1 2001 and NAS2 2002 make a cluster 201 which enables IP address takeover should one of NAS1 2001 or NAS2 2002 fail. Further, while the clustered NAS systems 201, 202 in the example are shown as having only two NAS nodes in each cluster, it should be understood that a larger number of NAS nodes may be used to form each cluster and not adversely affect the functionality of the invention.

To initiate remote copy, management software 1111 on a management host 1100, or other authorized source, issues a replication request command to NAS manager 2161 on NAS1 2001 and provides parameters such as the source file system a destination node and a destination file system. In the present example, the parameters are as follows: replication(2321, NAS3, 2324) and replication(2322, NAS3, 2325). NAS manager 2161, other replication software on NAS1 2001, or other known means can be used to manage the replication operations. Thus, the file system 2321 on NAS1 2001 serves as a source (primary) file system for the portion of the file system having the directory tree "export1" under it and the file system 2324 on NAS 3 serves as the destination (secondary or mirror) file system for this portion of the file system, such that file systems 2321 and 2324 make up a replication pair. Similarly, the file system 2322 on NAS1 2001 serves as a source (primary) file system for the portion of the file system having the directory tree "export2" under it, and the file system 2325 on NAS3 2003 serves as the destination (secondary) file system for this portion of the file system, such that file systems 2322 and 2325 make up a second replication pair. Further, while the file system of the present example is illustrated as being split among two volumes on the same NAS system, it should be understood that multiple portions of the file system may exist on a single volume, or the file system may be split among any number of volumes on any number of NAS systems within a NAS cluster. It should be further understood that multiple file systems may coexist on a NAS cluster or NAS system and that some or all may implement the present invention.

Under the invention, when the replication initialization process is completed, the NAS manager 2161 on NAS1 2001 sends a request for the creation of a referral file to NAS manager 2171 on NAS2 2002. NAS manager 2171 on NAS2 2002 requests the NFSv4 server 2131 on NAS2 2002 to create a referral file "NAS3:/export1" for "/export1" a file system 2331 and "NAS3:/export2" for "/export2" a file system 2332. While the file systems 2331 and 2332 are illustrated as separate file systems in FIG. 6 for ease of discussion, physically the referral files can be stored in a single file system on NAS2, i.e., with the directories being in the same file system. Further it is assumed that the same file or directory name does not exist on NAS2, or that some naming rule may be applied to the entire clustered NAS systems 201, 202 to avoid creating the same names for export directories, such as using NAS node names with the directory name. By creating these referral files on NAS2 2002, the file systems 2321 and 2322 will appear on NAS2 2002 as having been migrated to NAS3 2003 should a failover from NAS1 2001 to NAS2 2002 occur. This will utilize the NFSv4 redirection mechanism for NFSv4 clients 1012 to cause them to access the remote replicated data without their realizing that NAS1 2001 has failed and that IP address takeover has occurred in response to the failover.

Figure 7:
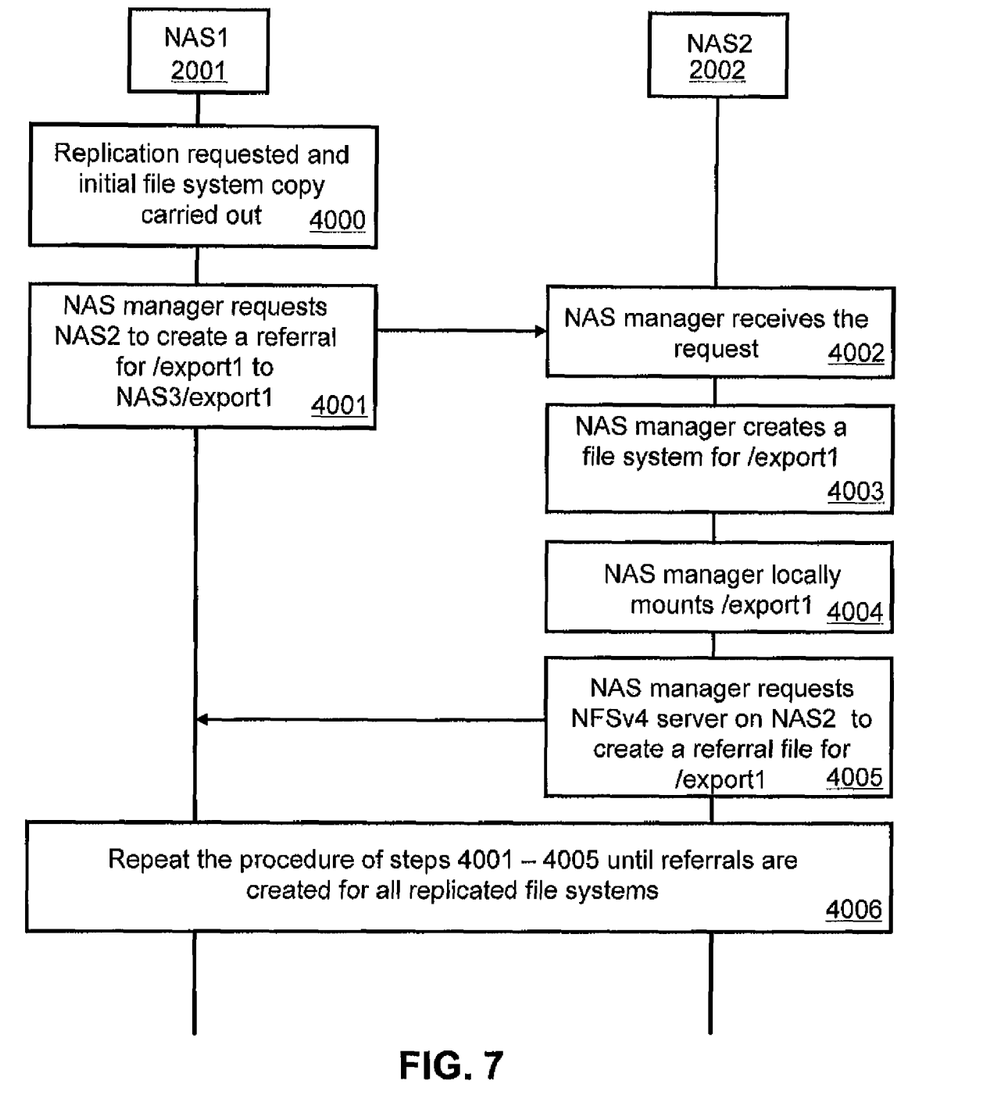
FIG. 7 illustrates a process flow for creating referrals for mirrored file systems according to the present invention.

FIG. 7 illustrates a flow of the replication process for creating the referral files on NAS2 2002 that includes the following steps:

Step 4000: The file system is initially replicated to the designated mirror secondary file system in the second cluster 202 that will form replication pairs with the primary file system in the first cluster 201. The replication of file systems takes place until all designated data have been replicated from the primary file systems to their secondary file systems.

Step 4001: After the file system replication process is completed, the NAS Manager 2161 requests the creation of referral files for each replicated file system. In the system illustrated in FIG. 6, a referral creation request for "/export1" file system 2321 is sent to NAS Manager 2171 on NAS2 2002 with parameters of replication destination node and directory. Thus, here NAS2 2002 is asked to create the referral. However, this does not mean that the invention is restricted by the number of nodes, and it is possible to configure more than two nodes to make up cluster 201. In this case, one of the clustered nodes will take over the IP address of NAS1 2001 following a failure, and the referral should be made on the node that will take over the IP address, or the referral should be made on all of the nodes in the cluster 201 in the same way.

Step 4002: NAS manager 2171 on NAS2 2002 receives the request.

Step 4003: NAS manager 2171 creates a new file system for "export 1"

Step 4004: NAS manager 2171 locally mounts the file system as "/export1" or just makes a directory for "export1".

Step 4005: NAS manager 2171 asks the NFSv4 server to create a referral file for the file system such as "NAS3:/export1" that refers to the remote NAS in which the original file system is mirrored. Physically the referral file can be stored in a disk drive on NAS2.

Step 4006: The same procedure is applied to the file system 2332.

Failover Processing under the Invention

Figure 8:
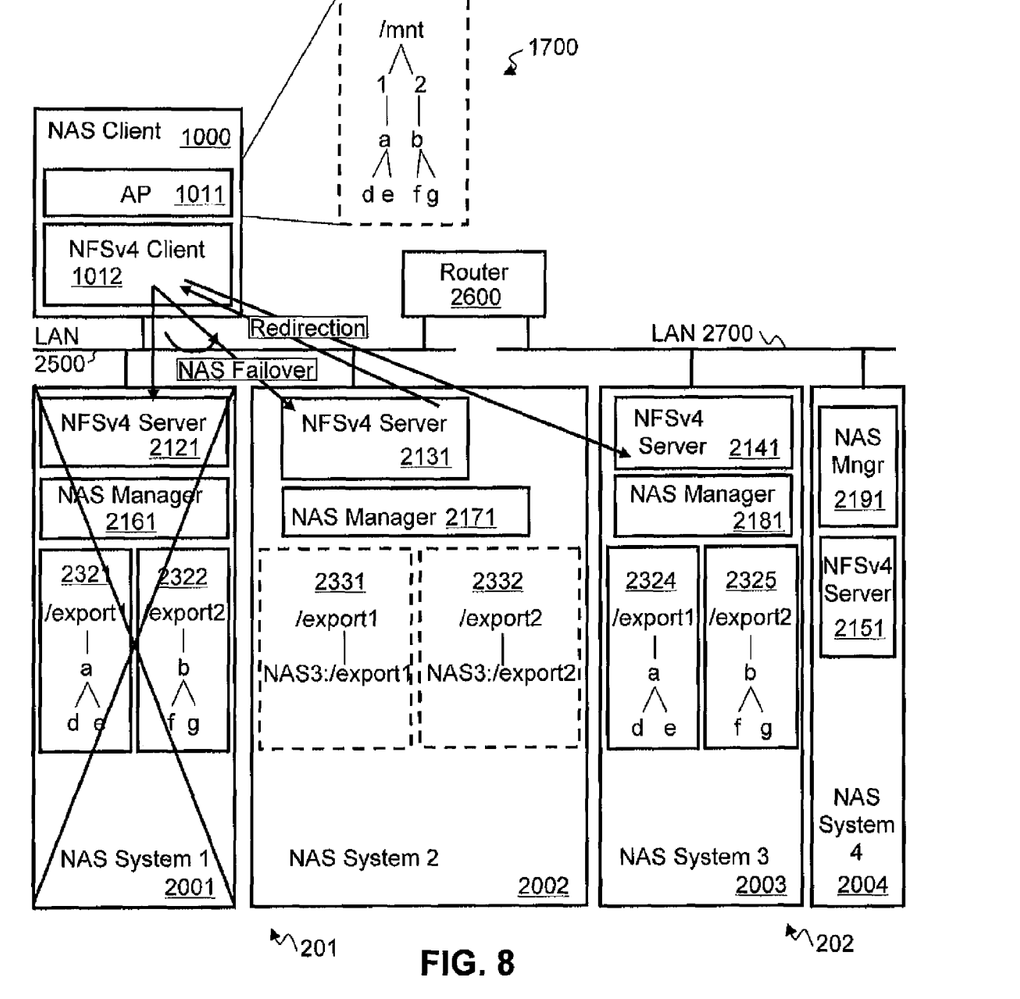
FIG. 8 illustrates a conceptual diagram of a failover process under the present invention.

FIG. 8 illustrates a conceptual diagram of failover processing according to the invention. The system configurations are the same as in FIG. 6 described above. When a failure occurs on NAS1 2001, the IP address of NAS1 2001 is taken over by NAS2 2002. Then, when the NFSv4 client 1012 attempts to access the data on NAS1, such as reading a file "f" in the file system 2322 using a command such as "READ(/mnt/2/b/f)", the NFS operation is sent to the NFSv4 server 2131 on NAS2 2002 rather than to NAS1 2001. The NFSv4 server 2131 on NAS2 2002 receives the request and processes it. The NFSv4 server 2131 looks up the directory "/export2" and finds the referral file "NAS3:/export2". Then, NFSv4 server 2131 on NAS2 2002 returns the location information ("fs_location") to the NFSv4 client 1012 on NAS client 1000. The NFSv4 client 1012 redirects the operation to the NFSv4 server 2141 on NAS3 according to the location information received from NAS2. NFSv4 server 2141 on NAS3 looks up the directory and opens the file "/export2/b/f" on the mirror file system 2325.

Figure 9:
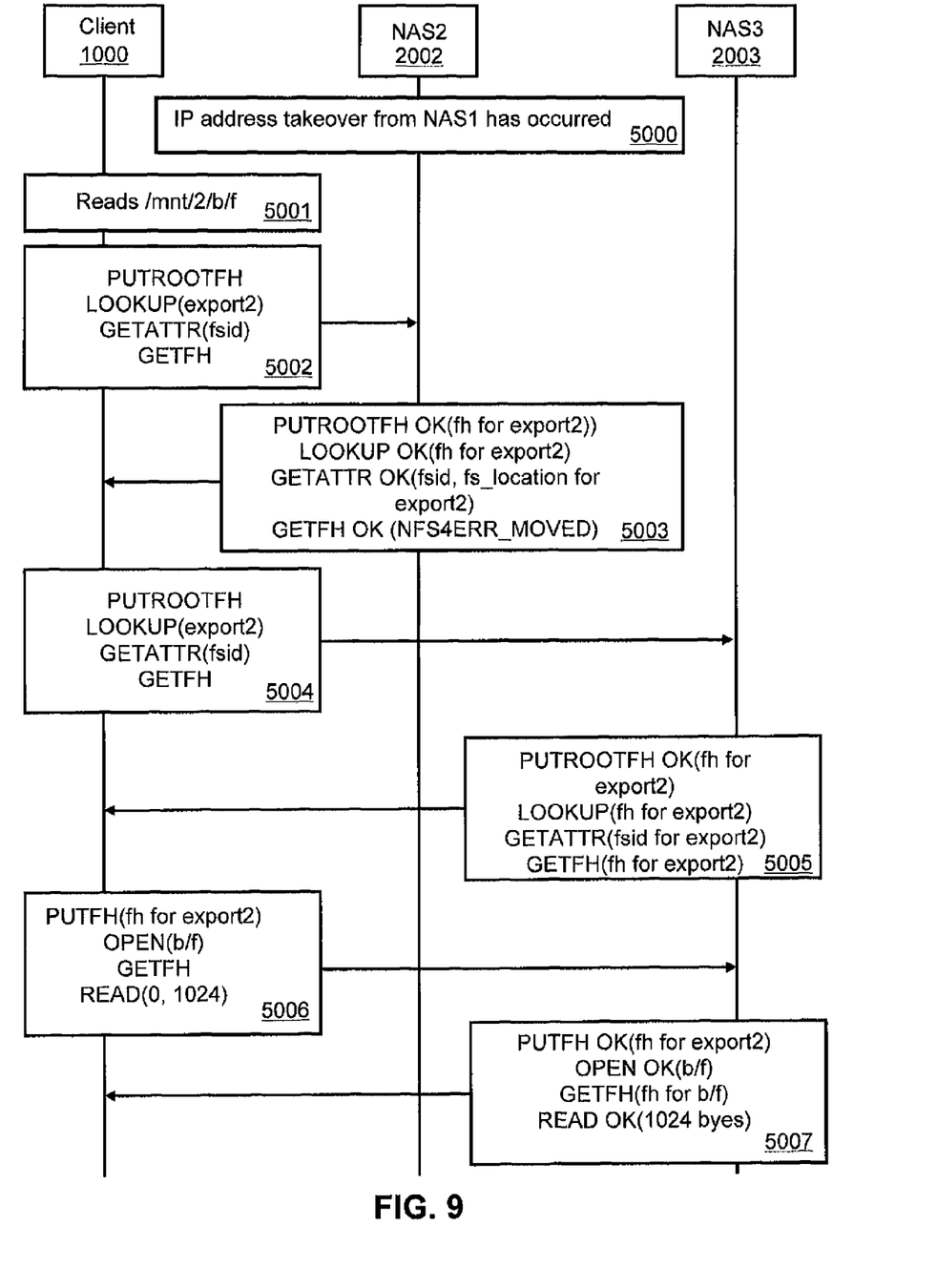
FIG. 9 illustrates a process flow for handling failover according to the present invention.

FIG. 9 illustrates a process flow for when a failure occurs on NAS1, which includes the following steps:

Step 5000: When a failure occurs on NAS1, the IP address of NAS1 2001 is taken over by NAS2.

Step 5001: The NFSv4 client attempts to access data in the file system 2322 on NAS1, such as by issuing a command "READ(/mnt/2/b/f)".

Step 5002: Because of the IP address takeover, the client operation is sent to the NFSv4 server 2131 on NAS2. The NFSv4 client looks up the mount point "/export2" first, by issuing a compound procedure containing PUTROOTFH, LOOKUP, GETATTR, and GETFH operations.

The PUTROOTFH operation instructs the server (NAS2) to set the "current" file handle to the root of the server's file tree. The root file handle is one of the special file handles in the NFS version 4 protocol. The root file handle is the "conceptual" root of the file system name space at the NFS server. The client uses or starts with the root file handle by employing the PUTROOTFH operation. Once this PUTROOTFH operation is used, the client can then traverse the entirety of the server's file tree with the LOOKUP operation.

The LOOKUP operation instructs the server to look up a specified file name or directory name on the server, and return the file handle for the file or the directory. In this case, the NAS2 server is instructed to look up the directory "export2".

The GETATTR operation obtains attributes for the file system object specified by the current file handle such as file type or file size.

The GETFH operation obtains the current file handle.

Step 5003: The NFSv4 server 2131 on NAS2 2002 receives the compound procedure from the NFSv4 client, and processes the procedure by looking up the directory "/export2". The NFSv4 server 2131 looks up the directory "/export2" and finds the referral file "NAS3:/export2". Then, NFSv4 server 2131 returns an error message "NFS4ERR_MOVED" and the location of the file system in an attribute of "fs_location" to the NFSv4 client. The "fs_location" is a structure containing the referral information. In this case, the "fs_location" contains the referral information "NAS3:/export2". In reference to this information, the NFSv4 client 1000 can determine to which location it has to redirect the operations. In this case, the NFSv4 client 1000 can determine from the referral information that the desired file is located in "NAS3:/export2".

Step 5004: The NFSv4 client 1000 redirects the operation to the NFSv4 server 2141 on NAS3 2003 based on the information in the fs_location attribute received at step 5003. Thus, the NFSv4 client 1000 looks up the directory "/export2" on NAS3 using the same compound procedure described above in step 5002.

Step 5005: The NFSv4 server 2141 on NAS3 successfully looks up "/export2" and returns a file handle of the directory "/export2".

Step 5006: The NFSv4 client requests to open and read the file "b/f" on NAS3 according to the file handle received at step 5005 by issuing a second compound operation that contains PUTFH, OPEN, GETFH, and READ operations.

The PUTFH operation replaces the current file handle with the file handle provided as an argument of the operation (in this case, the file handle for "/export2" is provided by the client).

The OPEN operation instructs the NAS3 server to open the file with the file handle provided as an argument of the operation (in this case, the file handle for "/export2/b/f" is provided).

The READ operation instructs the server to read the file and return the data to the client.

Step 5007: The NFSv4 server 2141 on NAS3 successfully opens and reads the file "b/f". Thus, the procedure described above enables the NFSv4 client to transparently continue to access the file system during the failover period by accessing a backup copy of the file system on a different clustered NAS system.

Failback Process Under the Invention

Figure 10:
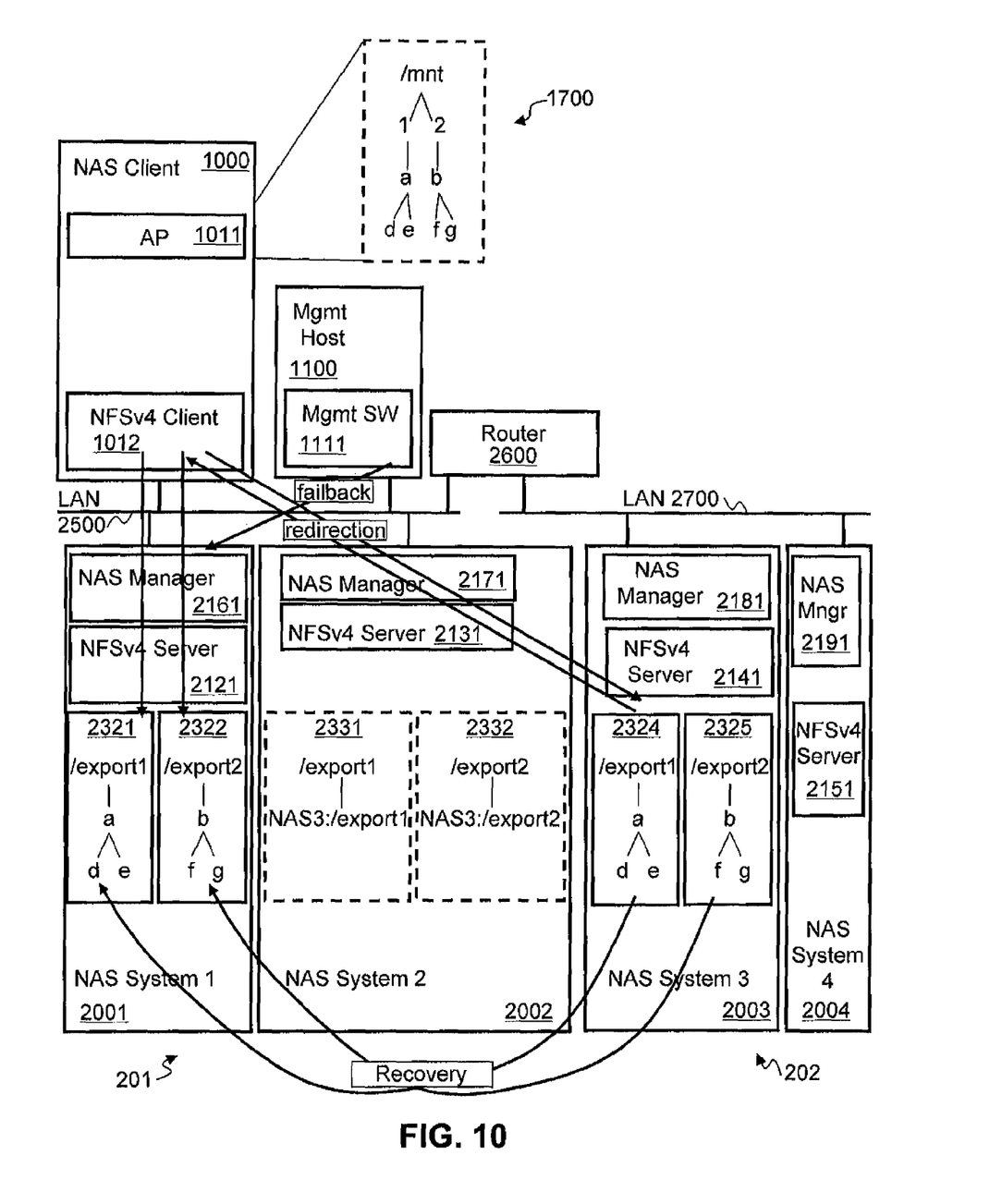
FIG. 10 illustrates a conceptual diagram of a failback process under the present invention.

FIG. 10 illustrates a conceptual diagram of a failback process according to the present invention. The system configurations in this example are the same as in the example discussed above in FIGS. 6 and 8. After finishing the hardware recovery of NAS1, such as by the replacement of hard disk drives, other parts, or the whole of the NAS1 2001, the software recovery starts. During the software recovery, the file systems are recovered to file systems 2321 and 2322. In this case, the mirrored file systems 2324 and 2325 on NAS3 are copied back to file systems 2321 and 2322, respectively, on NAS1. After completion of copying back the mirrored file system copies, the file system recovery is completed when the local NAS manager 2161 on NAS1 2001 mounts the recovered file systems. Then, the NFSv4 client 1012 should begin again to access NAS1 2001 even though it has been redirecting NFS operations to NAS3 2003 during the failover period. There are two possible situations that are described below: (1) the case wherein there was an access to the mirrored file system during the failover/failback period, and (2) the case in which there were no accesses to the file system during the failover/failback period.

Figure 11:
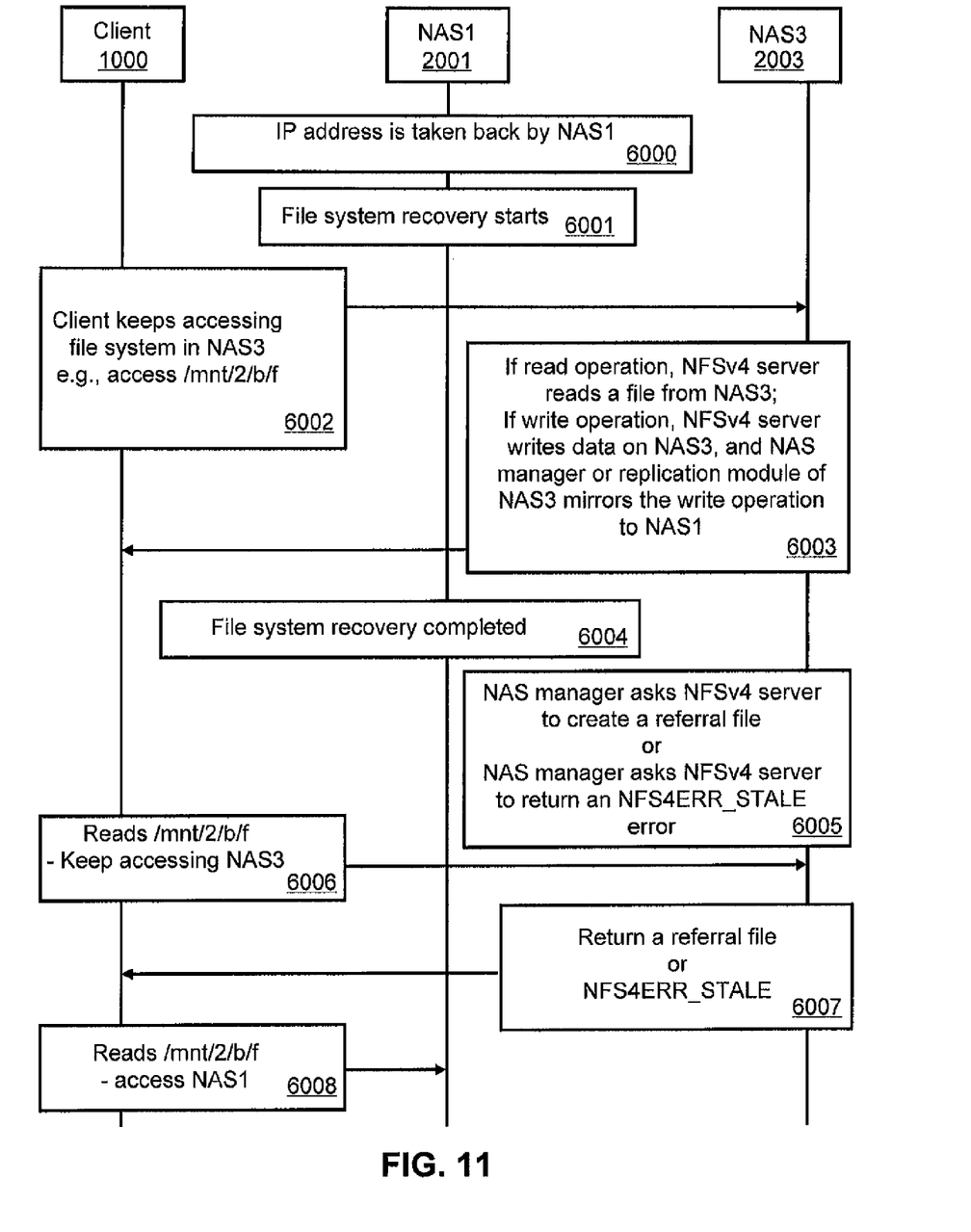
FIG. 11 illustrates a process flow of failback in a case in which there was an access to the mirrored file system during the failover period.

FIG. 11 illustrates a process flow of the case in which there was an access to the mirrored file system during the failover period, such as an access to the directory "/export2" 2325, which includes the following steps:

Step 6000: Following IP address takeover, the failed NAS system, NAS1 2001, is repaired or replaced. After finishing the hardware recovery of NAS1, such as by the replacement of hard disk drives, other parts, or the entire NAS system, and the recovery of the operating system, NAS1 2001 reboots and takes back the IP address from NAS2 2002.

Step 6001: At some point in time after the reboot, the management software 1111 on management host 1100 issues a recovery operation to NAS manager 2161 on NAS1 2001 for recovering the file systems "/export1" 2324 and "/export2" 2325 from NAS3 2003. NAS managers 2162, 2181 or other software on NAS1 2001 and NAS3 can take care of the file system recovery process.

Step 6002: During the file system recovery, when NFSv4 client attempts to accesses the directory "/export2" the operation is still sent to the "/export2" file system copy 2325 on NAS3, so that accesses to the file systems originally on NAS1 2001 continue to be redirected to NAS3 during the failback recovery period.

Step 6003: If, for example, there is a read access to the file system "/export2" during the recovery period, NFSv4 server 2141 on NAS3 2003 reads the data from the file system 2325 using normal NFSv4 read operations. If there is a write access to the file system "/export2" during the recovery, NFSv4 server 2141 on NAS3 writes the data to the file system 2325 on NAS3 using normal NFSv4 write operations. In addition, the NAS Manager 2181 or some other replication module on NAS3 2003 mirrors the write data to NAS1 2001. Another option is for NAS manager 2181 or other software on NAS3 to store the write operations and send the write operations to the NFSv4 server on NAS1 2001 after finishing the recovery process. Still another option is to block all write NFS operations to the failed file system during the failover and failback recovery period.

Step 6004: After the completion of copying back the mirrored file systems to NAS1, and NAS manager 2161 on NAS1 2001 locally mounts the file systems 2321 and 2322, NFSv4 client should now be ready to begin accessing NAS1 2001 instead of NAS3 2003.

Step 6005: There can be two options for accomplishing the switch back to accessing NAS1. First, NAS manager 2181 or some other replication module on NAS3 can request that the NFSv4 server 2141 on NAS3 create a referral for the recovered file system, such as for file system "/export2" 2325, creating a referral as "NAS1:/export2". Physically the referral file can be stored in a disk drive on NAS3. Then, when remote copy is restarted, a different file system name can be used for the mirrored file system to enable client access. Alternatively, NAS manager 2181 can request that the NFSv4 server 2141 on NAS3 return an NFS4ERR_STALE error when the NFSv4 client uses the current file handle. This will cause the NFSv4 client to revert to the original file handle on NAS1 by obtaining a new file handle for the file system. These operations are invoked by the request from NAS manager 2161 on NAS1 2001 or NAS manager 2163 on NAS3 at the completion of the mirrored file system recovery stage.

Step 6006: Then, the next time that the NFSv4 client accesses the file system, for example by a "READ(/mnt/2/b/f)" command, since there is still a file handle on the client, NFSv4 client 1012 sends the operation to NAS3.

Step 6007: When NFSv4 server on NAS3 receives the operation to the recovered file system, NAS3 returns the referral file or the NFS4ERR_STALE error.

Step 6008: Then, NFSv4 client again accesses the file systems on NAS1 2001 rather than on NAS3, and the operations carried out thereafter are the same as the normal file access operations under NFSv4.

Figure 12:
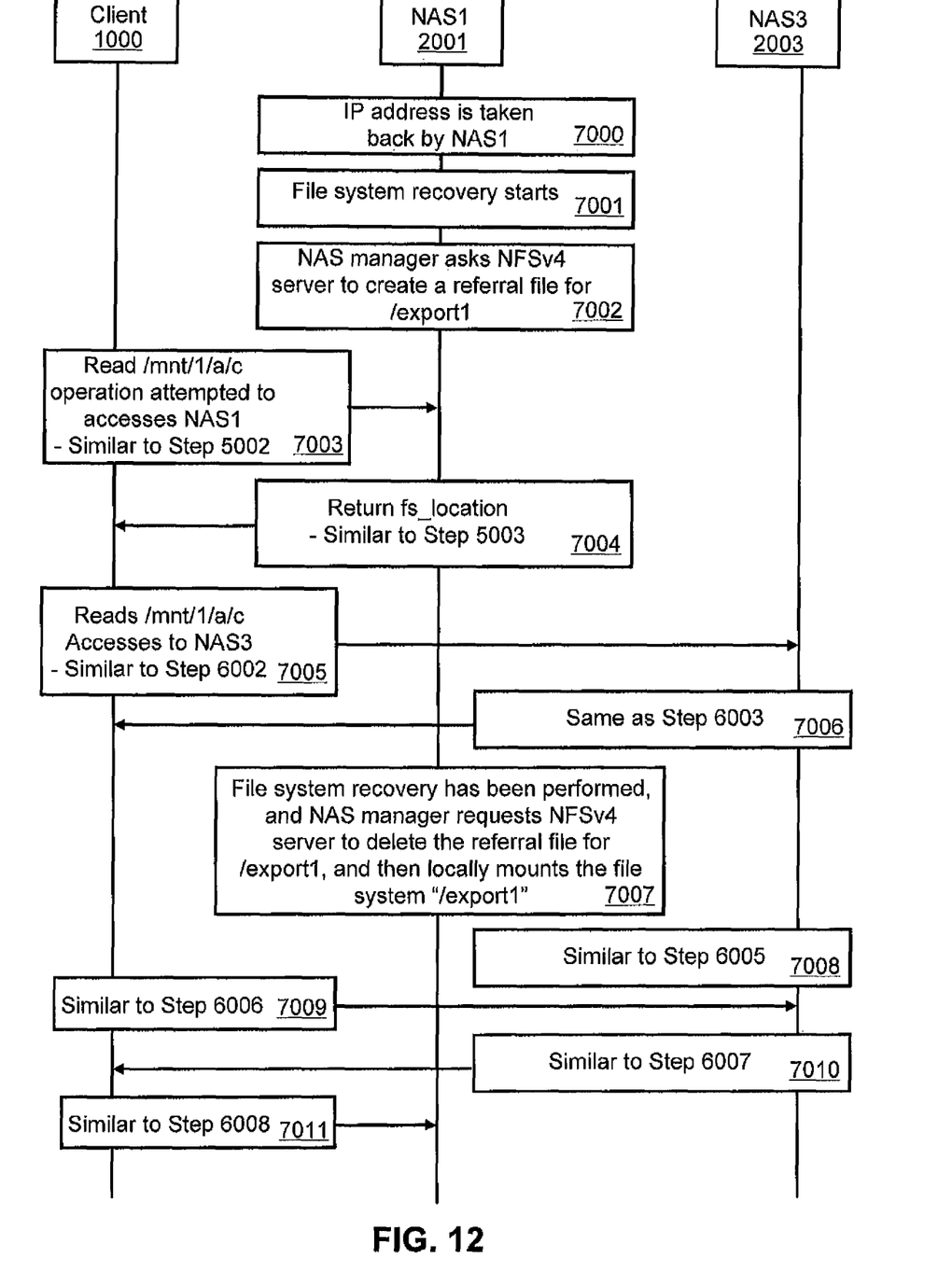
FIG. 12 illustrates a process flow of failback in a case in which there was no access to the mirrored file system during the failover period.

FIG. 12 illustrates a process flow in the case that there was no access to the mirrored file system during the failover/failback period, such as to the file system "/export1" 2324. The process flow includes the following steps:

Step 7000: After finishing the hardware recovery of NAS1, such as by the replacement of disks, other parts, or the entire NAS1 system, and the recovery of the operating system, NAS1 2001 reboots and takes back the IP address from NAS2.

Step 7001: At some time after the reboot, the management software 1111 on management host 1100 issues a recovery operation to NAS manager 2161 on NAS1 2001 for the file systems 2324 and 2325 on NAS3. NAS managers 2161, 2181 or other software on NAS1 2001 and NAS3 can perform the file system recovery process.

Step 7002: In order to redirect NFS operations to the mirrored site, NAS3 during the recovery, NAS manager 2161 requests that the NFSv4 server 2121 create a referral file for the exported file systems such as 2321 "/export1" as "NAS3:/export1" and 2322"/export2" as "NAS3:/export1" by using the file system mirror destination information, including destination node and location, stored on NAS1 2001 by NAS manager 2161 or some replication software on NAS1. This is similar to Steps 4001-4005 except that it is carried out on NAS1 2001, and physically the referral files can be stored in a disk drive on NAS1.

Step 7003: Once this is accomplished, then, during the file system recovery, when NFSv4 client 1012 attempts to access the directory "/export1" for the first time, the operation is sent to NAS1, because there was no access to the file system "/export1" during the failover period and there is no redirection information on the NFSv4 client 1012.

Step 7004: NFSv4 server on NAS1 2001 returns the redirection information set at Step 7002, which is similar to Step 5003 discussed above.

Step 7005: Then, the NFS operations are redirected to NAS3, which is the same as Step 6002 discussed above.

Step 7006: The NFS operations are processed by NFSv4 server 2141 on NAS3, which is the same as Step 6003 discussed above.

Step 7007: After the completion of copying back the mirrored file systems to NAS1, the NAS manager 2161 on NAS1 2001 requests the NFSv4 server 2121 to delete the referral files created at Step 7002, and then, NAS Manager 2161 locally mounts the recovered file systems.

Step 7008: Like 6005, on NAS3, in order to redirect the NFS operations back to NAS1, NAS Manager 2181 or some other replication module on NAS3 asks the NFSv4 server on NAS3 to create a referral for the recovered file system "/export1" 2324 as "NAS1:/export1". Physically the referral file can be stored in a disk drive on NAS3. In another method, NAS Manager 2181 requests the NFSv4 server on NAS3 to return an NFS4ERR_STALE error when the NFSv4 client will use the current file handle.

Steps 7009-7011: NFSv4 client returns to being able to access the file system such as "READ(/mnt/1/a/c)" in the same way as described for steps 6006-6008 above.

Thus, it may be seen that the present invention sets forth a system and method by which NFSv4 clients are provided with a failover method for remotely mirrored clustered NAS file servers. The invention provides a mechanism of redirecting the NFS operations to the remotely mirrored site upon failure of a NAS. Accordingly, an NFSv4 client can transparently access the remotely mirrored file system during the failover/failback period. Further, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the above description has been made in an illustrative fashion, and not a restrictive one. Accordingly, the scope of the invention should properly be determined with reference to the appended claims, along with the full range of equivalents to which such claims are entitled.

What is claimed is:

1. A method of controlling a plurality of file systems, said plurality of file systems includes a first, second, and third file system, said plurality of file systems are clustered and has a single namespace, comprising:

establishing a mirroring relationship between the first file system and the third file system, wherein a copy of the first file system is replicated to the third file system;

creating a first referral on the second file system, wherein an access request from a client computer directed to the second file system for accessing a file stored in the first file system is directed to the third file system by the first referral whereby the copy of the first file system is accessed;

directing access from said client computer to the third file system after the first file system receives a failback request from a management server, wherein an IP address of the first file system is assumed by the second file system on which the first referral was created, wherein if said access from said client computer is read access, file is read from said third file system, and wherein if said access from said client computer is write access, data is written to said third file system and a replication of said data is written to the first file system, wherein a network of the third file system is separated from a network of the first and second file systems by a router.

2. The method of claim 1, wherein the IP address of the first file system is taken over by the second file system so that the client computer directs requests to access the first file system to the second file system.

3. The method of claim 1, further comprising:

copying back the mirrored file system from the third file system to the first file system in response to said failback request from a management server;

directing access from said client computer to the first file system after said copying back operation is completed.

4. The method of claim 3, further comprising:

creating a second referral on the third file system and sending said second referral to said client computer after said copying back operation is completed, wherein said directing access to the first file system is performed after said second referral is sent from said third file system to said client computer.

5. The method of claim 1, wherein said creating said first referral on the second file system is performed after said management server issues a mirror establishing request to said first file system.

6. The method of claim 1, wherein said establishing a mirroring relationship between the first file system and the third file system is performed in response to a request from said management server.

7. The method of claim 3, wherein the first referral is created by using information of location of the third file system stored in the first file system.

8. The method of claim 1, wherein the directing is performed by using NFSv4 protocol.

* * * * *